United States Patent [19]

Tsujita

[11] Patent Number: 5,059,124
[45] Date of Patent: Oct. 22, 1991

[54] IMITATION APPARATUS FOR FIRE EXTINGUISHING TRAINING

[76] Inventor: Masahiro Tsujita, 2-8-19, Ebisunishi, Naniwa-ku, Osaka-shi, Osaka-fu, Japan

[21] Appl. No.: 562,197

[22] Filed: Aug. 3, 1990

[51] Int. Cl.⁵ .............................................. G09B 9/00
[52] U.S. Cl. .................................................. 434/226
[58] Field of Search ............................... 434/219, 226

[56] References Cited

U.S. PATENT DOCUMENTS 4,001,949  1/1977  Francis ................................. 434/226
4,861,270  8/1989  Ernst et al. ........................... 434/226

FOREIGN PATENT DOCUMENTS 0828203  5/1981  U.S.S.R. ............................... 434/226

Primary Examiner—Richard J. Apley
Assistant Examiner—Glenn E. Richman
Attorney, Agent, or Firm—Spensley Horn Jubas & Lubitz

[57] ABSTRACT

An imitation apparatus for fire extinguishing training which comprises a imitation nozzle of a imitation extinguisher, a nozzle direction detecting device for detecting direction of the imitation nozzle, an effect appraisal device for appraising extinct effect, and a selecting device for selecting fire videos from a video disc according to the extinct effect.

8 Claims, 11 Drawing Sheets

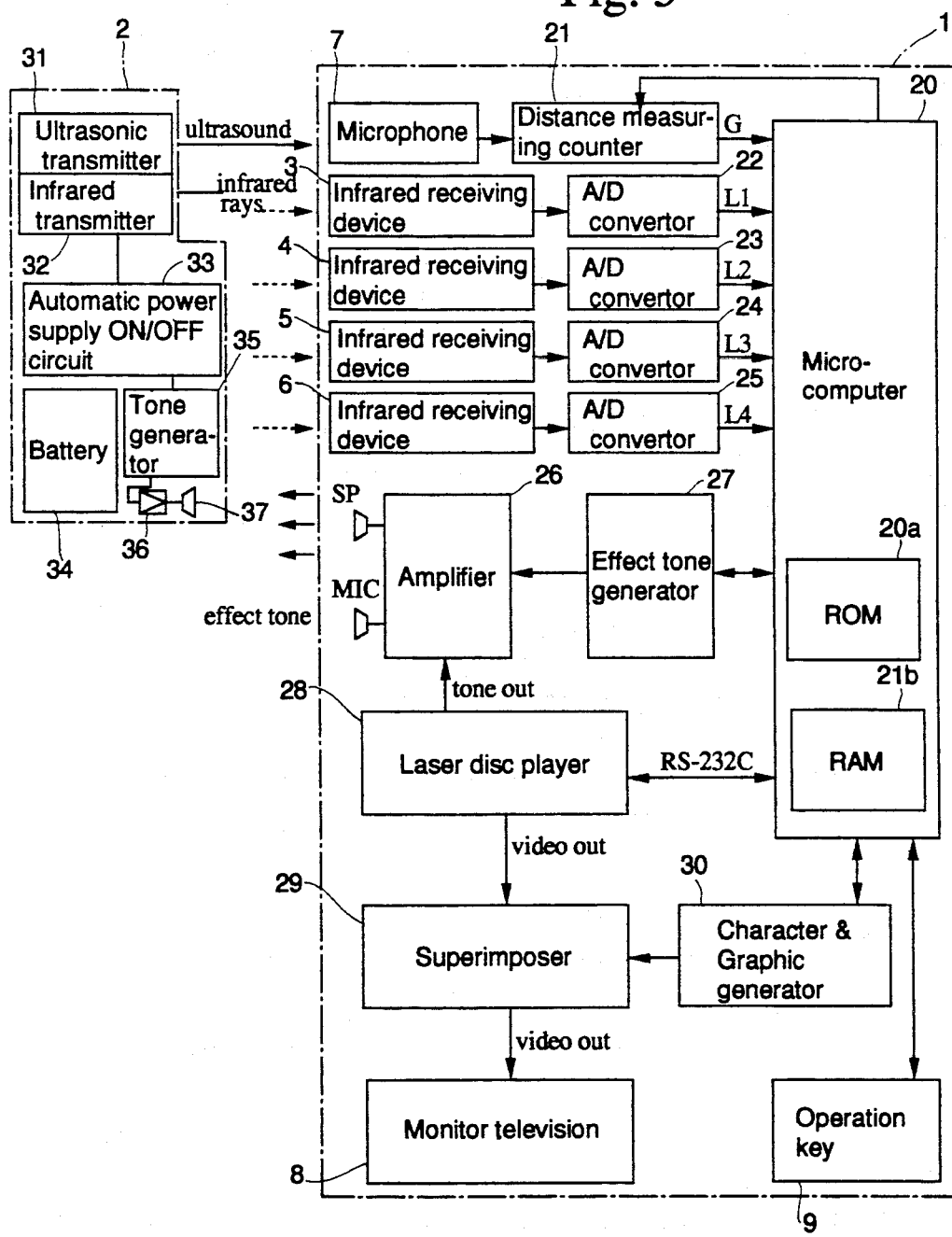

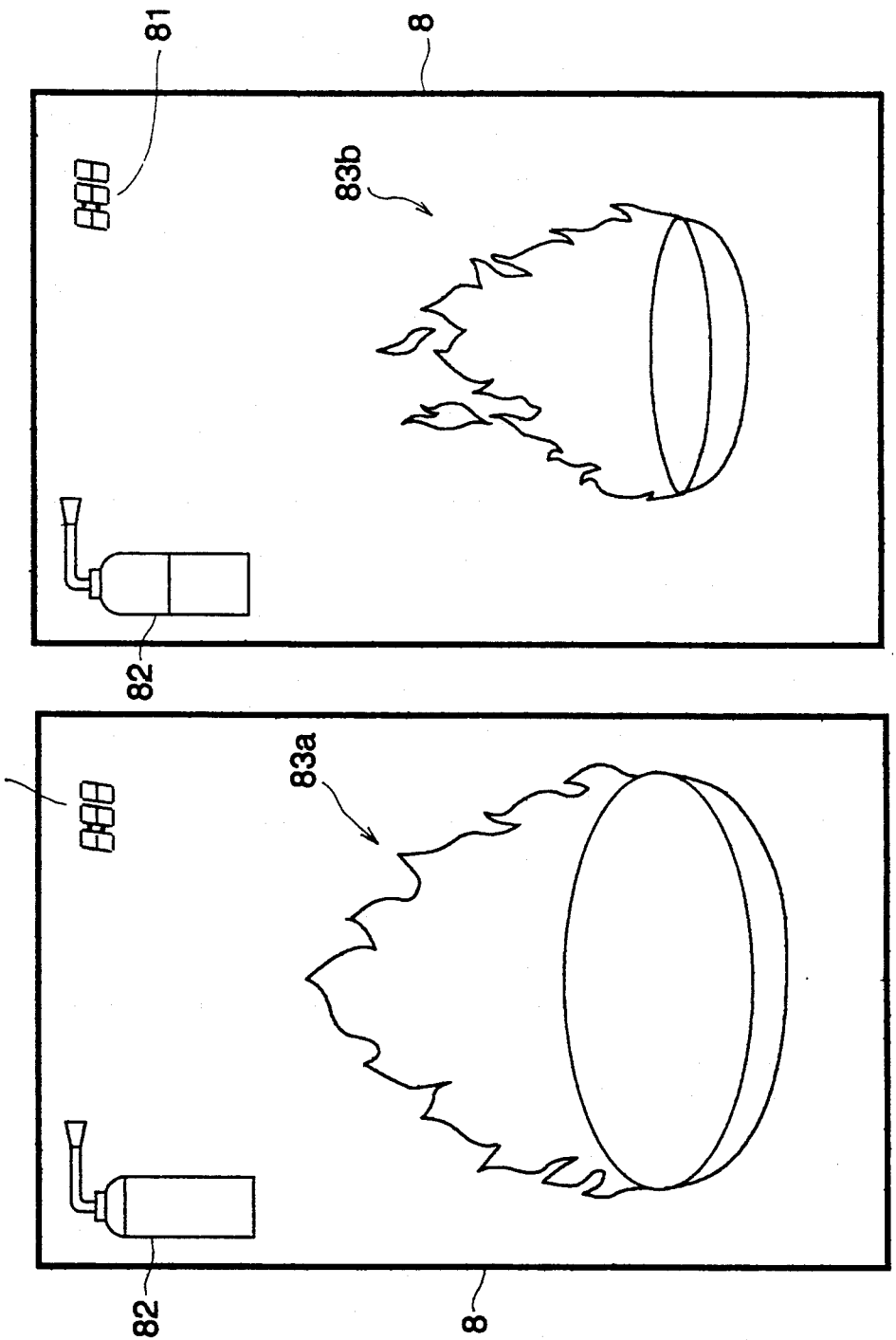

Fig. 5

| video | mixing tone |
|---|---|
| ignition | little burning tone |
| initial stage 1,spread direction | little burning tone |
| initial stage 1,extinct direction | little burning tone |
| initial stage 1,extinction | "very good!" |
| initial stage 2,spread direction | little burning tone |
| initial stage 2,extinct direction | little burning tone |
| initial stage 2,extinction | "extinguished somehow!" |
| middle stage,spread direction | large burning tone |
| middle stage,extinct direction | large burning tone |
| middle stage,extinction | "extinguished riskily!" |
| later stage,spread direction | large burning tone |
| later stage,extinct direction | large burning tone |
| later stage,extinction | "hair breadth extinction!" |
| latest stage,spread direction | large burning tone "fell into danger!" siren |

Fig. 8

| | |
|---|---|
| 5500 | ignition |
| 6400 | farther fire, initial stage 1, spread direction |
| 7000 | farther fire, initial stage 1, extinct direction |
| 7600 | farther fire, initial stage 1, extinction |
| 8800 | farther fire, initial stage 2, spread direction |
| 9400 | farther fire, initial stage 2, extinct direction |
| 10000 | farther fire, initial stage 2, extinction |
| 11200 | farther fire, middle stage, spread direction |
| 11800 | farther fire, middle stage, extinct direction |
| 13000 | farther fire, middle stage, extinction |
| 13600 | farther fire, later stage, spread direction |
| 14200 | farther fire, later stage, extinct direction |
| 15400 | farther fire, later stage, extinction |
| 16000 | farther fire, latest stage, spread direction |
| 17200 | nearer fire, initial stage 1, spread direction |
| 17800 | nearer fire, initial stage 1, extinct direction |
| 18400 | nearer fire, initial stage 1, extinction |
| 19600 | nearer fire, initial stage 2, spread direction |
| 20200 | nearer fire, initial stage 2, extinct direction |
| 20800 | nearer fire, initial stage 2, extinction |
| 22000 | nearer fire, middle stage, spread direction |
| 22600 | nearer fire, middle stage, extinct direction |
| 23800 | nearer fire, middle stage, extinction |
| 24400 | nearer fire, later stage, spread direction |
| 25000 | nearer fire, later stage, extinct direction |
| 26200 | nearer fire, later stage, extinction |
| 26800 | nearer fire, latest stage, spread direction |
| 28000 | |

Fig. 9

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 |
| 9 | 0 | 0 | 0 | 0 | 0 | 0 | 1 | 0 | 0 | 0 | 0 | 0 | 0 |
| 10 | 0 | 0 | 0 | 0 | 1 | 1 | 1 | 1 | 1 | 0 | 0 | 0 | 0 |
| 11 | 0 | 0 | 1 | 1 | 2 | 4 | 5 | 4 | 2 | 1 | 1 | 0 | 0 |
| 12 | 0 | 1 | 2 | 3 | 4 | 5 | 5 | 5 | 4 | 3 | 2 | 1 | 0 |
| 13 | 0 | 0 | 0 | 0 | 1 | 1 | 1 | 1 | 1 | 0 | 0 | 0 | 0 |
| 14 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |

| extinguish video progress | valid points | | | | | | |
|---|---|---|---|---|---|---|---|
| | 00 | 0 | 1 | 2 | 3 | 4 | 5 |
| initial 1 stage | -8 | -20 | 18 | 15 | 13 | 11 | 9 |
| initial 2 stage | -10 | -20 | 24 | 21 | 18 | 15 | 12 |
| middle stage | -17 | -20 | 30 | 26 | 22 | 18 | 15 |
| later stage | -20 | -20 | 36 | 31 | 26 | 22 | 18 |

IMITATION APPARATUS FOR FIRE EXTINGUISHING TRAINING

FIELD OF THE INVENTION

This invention relates to an imitation apparatus for fire extinguishing training which can make a person train fire extinguishing of simulation, by using a video display device such as a monitor television and a imitation extinguisher.

DESCRIPTION OF THE PRIOR ART

Generally, imitation extinguishing training has been performed regularly, in schools or companies. In such a place, extinguishing training has been performed by using an actual fire extinguisher after firing kerosene or wood.

However, the above extinguishing training has a problem that it is necessary to fire kerosene or wood and after that to use the actual fire extinguisher. Moreover, the training needs lager space away from building to perform it. And the kerosene or the wood has to be prepared on every training.

SUMMARY OF THE INVENTION

It is therefore an object of this invention to provide an imitation apparatus for fire extinguishing training which can get simply training effect as well as the conventional training way and can perform the training repeatedly.

It is another object of this invention to provide an imitation apparatus for fire extinguishing training which can simulate actual fire extinguishing by using an imitation fire extinguisher and displaying a firing video without actual fire.

BRIEF DESCRIPTION OF THE DRAWING

FIG. 3 is a block diagram of the imitation apparatus for fire extinguishing training. FIGS. 4 (A) and 4 (B) show a display picture of the imitation apparatus for fire extinguishing training. FIG. 5 shows a generation tone signal of a effect tone generator in a simulation mode of the imitation apparatus for fire extinguishing training.

FIG. 6 (A) and FIG. 6(B) are flow charts showing process of a controller of the imitation apparatus for fire extinguishing training. FIG. 8 shows stored contents of a fire video in stored means of the imitation apparatus for fire extinguishing training. FIG. 9 shows valid points on the display.

DESCRIPTION OF THE PREFERRED EMBODIMENT

Figure 1:
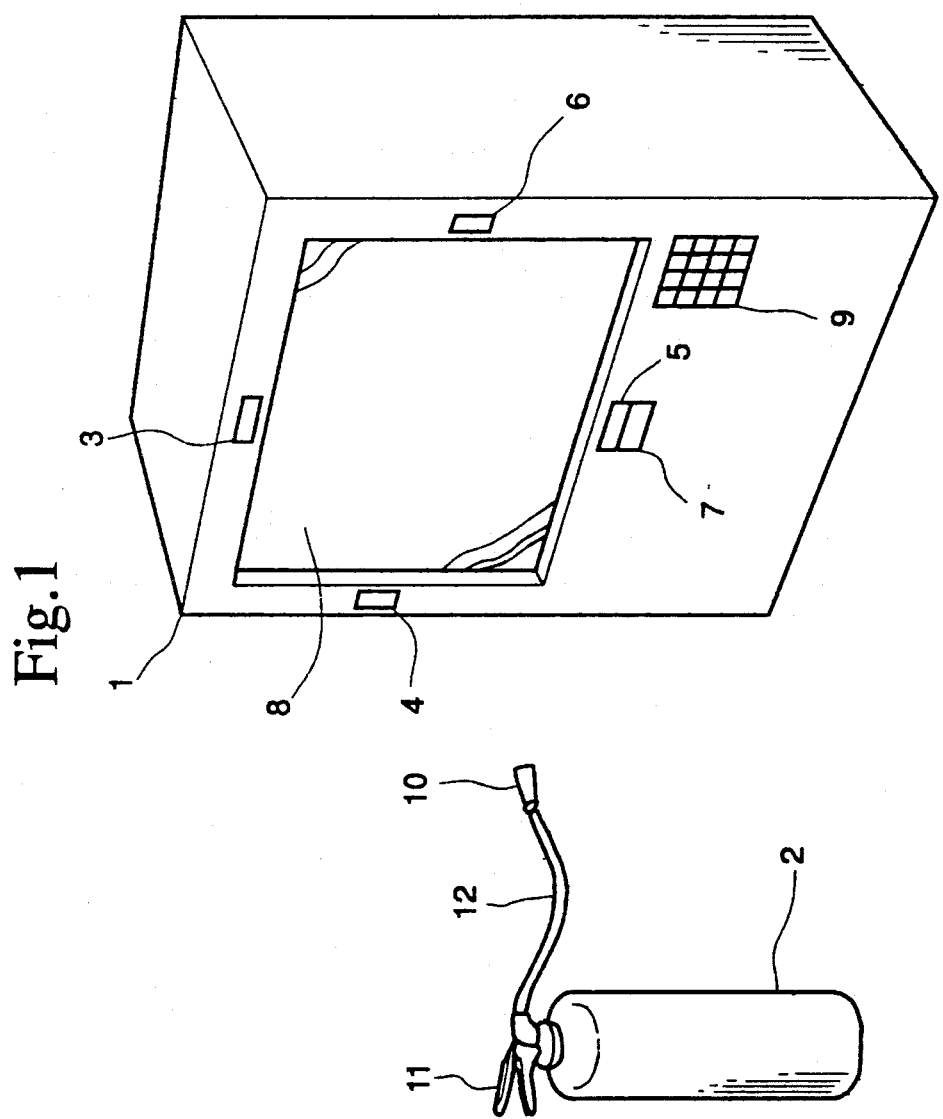
FIG. 1 shows a external view of an imitation apparatus for fire extinguishing training which is an example of this invention.

FIG. 1 is a external view of the imitation apparatus for fire extinguishing training of an example of this invention.

The imitation apparatus for fire extinguishing training comprises an imitation apparatus body 1 and an imitation extinguisher 2. The imitation apparatus is provided with a monitor television 8 exposed on a front part of the imitation apparatus body 1. The monitor television 8 is composed by an ordinary color television. The imitation apparatus body 1 is provided with sensors 3 to 6 around the television. The sensors can receive infrared rays. A microphone 7 receiving ultrasound is provided below the sensor 5. A keyboard 9 is provided below the monitor television 8.

The imitation extinguisher 2 has a lever 11 and a hose 12. The hose is provided with an imitation nozzle 10 at an end of the hose 12. The imitation extinguisher 2 has inside a ultrasonic transmitter and a infrared receiver. When the lever 11 is operated the ultrasonic transmitter is raised on and an ultrasonic generating element and an infrared LED are driven. This infrared LED is provided at an end of the imitation nozzle 10 as well as an ultrasonic speaker.

Figure 2:
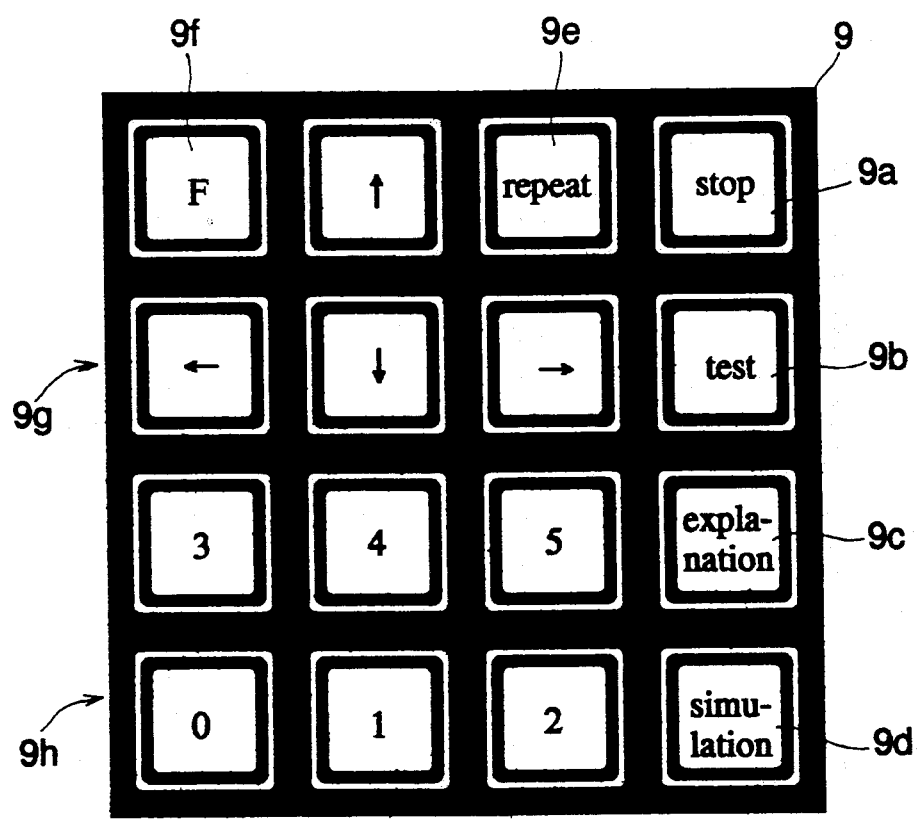
FIG. 2 is a front view of an operation panel provided on the imitation apparatus.

In FIG. 2, a operation panel 9 provided below the monitor television 8 at a front part of the imitation apparatus body 1, has plural operation keys. If an explanation key 9c is operated an example video of initial fire is displayed on the monitor television 8. If a test key 9b is operated a extinguish operation video is displayed on the monitor television 8. When a simulation key 9d is operated a biggest fire video is displayed on the monitor television 8, simulation of extinguishing used the imitation extinguisher 2 being performed. When a repeat key 8e is operated the fire video in previous simulation is re-displayed. When a stop key 9a is operated all processes of the apparatus are stopped and the process is initialized. A function key 9f, a cursor key 9g and a ten key 9h are utilized for setting a valid points stated later.

In FIG. 3 the imitation apparatus body 1 is provided inside with a microcomputer 20 controlling the other device in the body 1. The microcomputer 20 has a ROM 20a and a RAM 20b. The microcomputer 20 is connected to a laser disc player 28 through a RS-232C interface. The laser disc player 28 plays back a video of a laser disc where fire videos is recorded. The microcomputer 20 is connected to a infrared receiving devices 3 to 6 through AD convertors 22 to 25. The infrared receiving devices 3 to 6 receive infrared rays and output a voltage level corresponding to lightness there of. The AD convertors 22 to 25 convert the voltage level outputted from the infrared receiving devices 3 to 6 to digital values and input it to the microcomputer 20. A distance measuring counter 21 starts counting of non-figured clock pulse as receiving a start pulse from the microcomputer 20, and stops the counting as receiving a signal from the ultrasound microphone 7. The microcomputer 20 reads the count value of the counter 21 as a extinct distance data. The AD convertor's output data and the above extinct distance data are stored in a specific area of the RAM 20b successively. The data is utilized for playing back the fire video on operation of the above repeat key.

The effect tone generator 27 is connected to an amplifier 26 having a speaker 27. The effect tone generator 27 generates a firing tone and an appraisal tone. The amplifier 26 has a selecting switch circuit which can select the laser disc player's outputting tone or the effect tone generator's outputting tone, and drives the speaker. A character and graphic generator 30 generates a character or a graphic displayed on a specific area of the television monitor 8 based on a selecting signal outputted from the microcomputer 20. The character or the graphic is for displaying, for example, lapse time from the time of extinguishing operation start to current time, or remains of extinct material shown in FIG. 4 (A) and FIG. 4 (B). A superimposer 29 superimposes the video output of the character and graphic generator 30, on the video output of the laser disc player 28, and outputs the superimposed video signal to the monitor television 8. The microcomputer 20 reads a key operation of the operation key 9.

The imitation extinguisher 2 is provided with the ultrasonic transmitter 31 and the infrared transmitter 32. These transmitters 31 and 32 are supplied with a power from a battery through an automatic power supply ON/OFF circuit 33. The automatic power supply ON/OFF circuit 33 supplies the power from the battery to the transmitters 31 and 32 automatically, when a non-drawed safety pin is pulled out and the lever 11 is operated. The circuit 33 is turned off, if the lever 11 is kept un-operation condition more than 10 seconds. The circuit 33 also is turned off automatically, if accumulation of the operation time of the lever 11 is 20 seconds or more in case that intermittent operations of the lever 11, where each un-opration condition is kept less than 10 seconds, are performed. Moreover the circuit 33 also supplies the power to an extinguish tone generator 35 generating a jetting tone of extinct material as supplied with the power. The jetting tine is outputted from the speaker 37 through the amplifier 36.

The ultrasonic transmitter 31 is provided with the ultrasonic generating element, FM modulator, and a speaker. The transmitter 31 outputs an FM modulated ultrasound with a fixed period. The infrared transmitter 32 comprises an infrared LED and an LED drive circuit, turning the infrared LED on, therefore emitting the infrared rays. The infrared LED is positioned at the end of the imitation nozzle 10 as stated above, the infrared rays from the infrared LED being received by the infrared receiving devices 3 to 6. The microcomputer 20 receives receiving data L1 to L4 from the AD converters 22 to 25 corresponding to a quantity of the receiving rays. The infrared receiving device nearer to the direction of the imitation nozzle 10 outputs higher level signal. Therefore the microcomputer 20 detects a direction of the imitation nozzle 10 based on the receiving data L1 to L4.

It is taken into consideration that the infrared rays features characteristic which is not affected greatly by environment changing such as temperature, humidity or noise between the imitation nozzle 10 and the imitation apparatus body 1.

Figure 6:
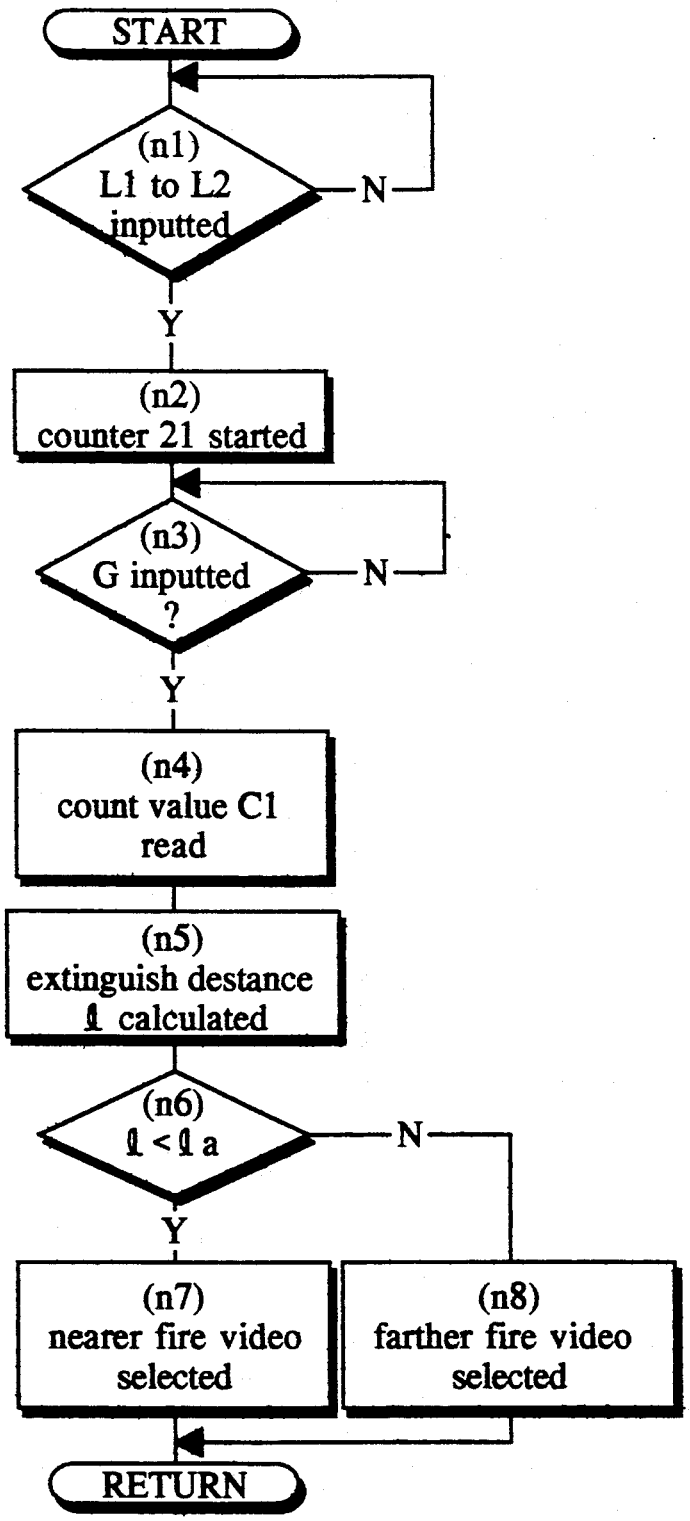
Figure 6:
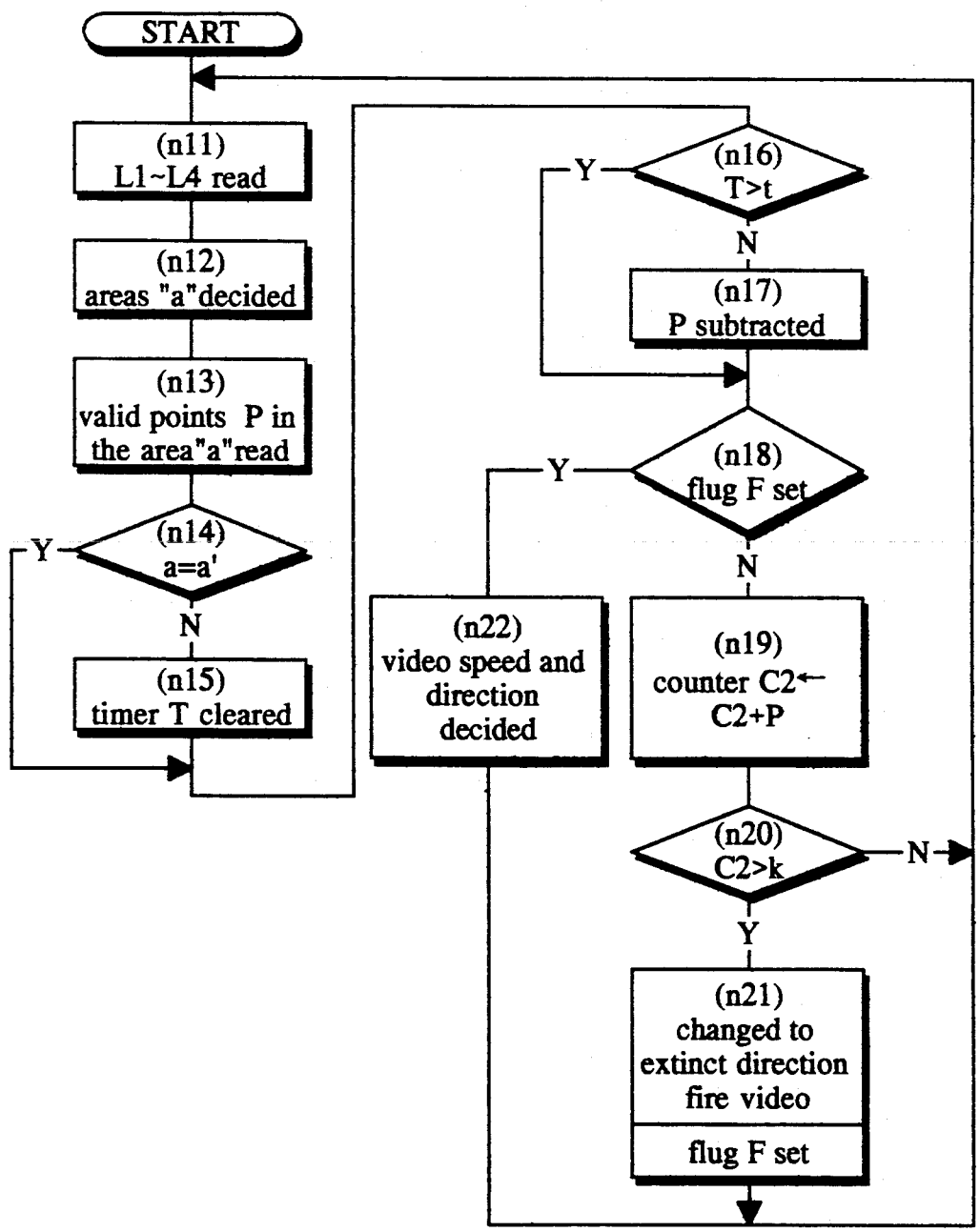
Figure 7:
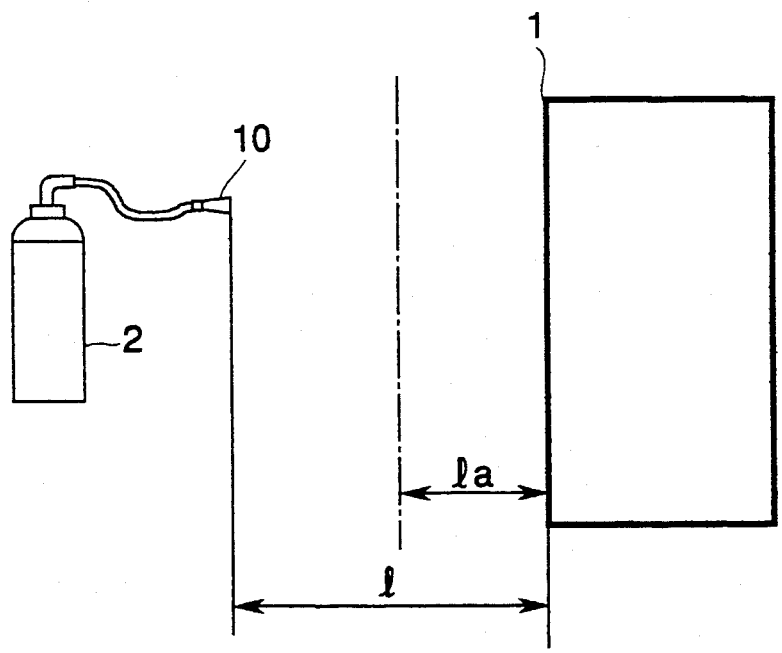
FIG. 7 shows position relation between the imitation apparatus for fire extinguishing training and a imitation nozzle.

In FIG. 6 (A), the microcomputer 20 performs a process with a sampling time such as 40 ms. First, a judgement whether the receiving data L1 to L4 is inputted is performed (n1), a count start signal being inputted to the distance measurement counter 21 based on the receiving data L1 to L4 (n2). Therefore the counter 21 starts counting the non-drawn clock pulse. Next, the ultrasound microphone 7 receives the ultrasound transmitted from the imitation extinguisher 2, outputting a receiving data G to the microcomputer 20 (n3). The microcomputer 20 reads the count value of the counter 21 (n4), and at the same time the counter 21 stops counting. Then an extinguish distance 1 is calculated based on the count value C1 from the counter 21, therefore a judgement whether the extinct distance 1 is shorter than a specific distance 1a shown in FIG. 7 is performed. If the extinct distance 1 is shorter than the specific distance 1a which is a distance between the imitation nozzle 10 and the monitor television 8, a fire video watched at a place near to the fire (a nearer fire video) is displayed, whereas if the extinct distance 1 is longer than the specific distance 1a, a fire video watched at a place far from the fire (a farther fire video) is displayed (n7, n8).

In the imitation extinguisher 2 the infrared LED is turned on when the ultrasound is generated, the microcomputer 20 considering the infrared receiving timing the ultrasound generating timing in the imitation extinguisher 2. Therefore, the microcomputer 20 measures the time between the infrared receiving timing and the ultrasound receiving timing because the time is ultrasound propagation time between the imitation nozzle 10 and the imitation apparatus body 1. The distance between the imitation nozzle 10 and the imitation apparatus body 1 is measured according to that time.

The laser disc which is played back by the laser disc player 28 stores variety fire videos such as an early stage 1 and 2 video, an middle stage video, or a later stage video. Each of the videos is a fire video displaying a spread direction fire, an extinct direction fire or an extinguished condition, photographed by a video camera at a place nearer to the actual fire and a place farther from the actual fire respectively In the case that the imitation nozzle 10 is located at a farther place than a place in the specific distance 1a from the imitation device body 1, the farther fire video is played back as shown in FIG. 4 (B), whereas in the case that the imitation nozzle 10 is located at a nearer place than a place in the specific distance 1a from the imitation device body 1, the nearer fire video is played back as shown in FIG. 4 (A).

For example, in the case that the imitation nozzle 10 is located at a farther place than a specific distance 1a, and the imitation nozzle 10 is neared by the operator to a voluntary place located within the specific distance 1a, from the state that the videos of the middle stage extinguish direction fire which is in the video disc with flame members 11800 to 13000 shown in FIG. 8 has been displaying, the microcomputer 20 detects that state, instructing the laser disc player 28 to play back the pertinent flames with numbers 22600 to 23800. Thereby, the displaying video in the monitor television 8 is changed from the farther fire video (a fire video viewed from the farther place) shown in FIG. 4 (B) to the nearer fire video (a fire video viewed from the nearer place) shown in FIG. 4 (A).

FIG. 6 (B) is a flow chart showing a effect appraise process of the imitation apparatus for fire extinguishing training.

The microcomputer 20 performs the process shown FIG. 6 (B) with the sampled period of about 10 ms in the simulation mode. First, receiving data L1 to L4 outputted from the AD converters 22 to 25 is read, and display areas of the monitor television 8 to which the imitation nozzle 10 points is decided. The view face of the monitor television 8 is divided in 16 parts vertically and in 13 parts horizontally; totally in 208 parts. The microcomputer 20 decides the display areas "a" pointed by the imitation nozzle 10 based on the receiving state of the infrared receivers 3 to 6 (n12). Next, the microcomputer 20 reads the valid points P set in the decided areas "a" (n13). The specific point within the valid points 0 to 5 is set in each of divided areas of the monitor television's display area as shown in FIG. 9, these valid points being stored in the RAM 20b in the microcomputer 20. The valid point number can be changed by the operation of the function key 9f, the cursor key 9g, and the numeric key 9h, regarding the nearer fire video and the farther fire video.respectively.

Figure 10:
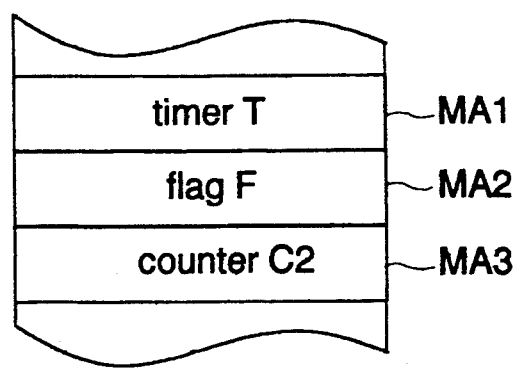
FIG. 10 is a main memory map of a RAM in a microcomputer provided in the imitation apparatus for fire extinguishing training.

After the microcomputer 20 reads the valid points P in the areas "a", a judgement whether the areas "a" is the same as the areas "a'" decided at the previous sampled timing is performed (n14). If the imitation nozzle 10 is moved and the direction of it is varied, the decided areas "a" at the current sampling timing differs from the previous areas "a'". In this case a timer T is cleared allocated in an area MA1 of the RAM 20b as shown FIG. 10 (n15). While if the imitation nozzle 10 is not moved and the direction of the imitation nozzle 10 is the same direction as previous time, the process proceeds to n16 and a judgement whether the timer counts over a reference value t (n16). This timer counts the time while the direction of the imitation nozzle 10 keeps non-moving state. If the direction of the imitation nozzle 10 keeps the non moving state for specific period, the valid points in the areas "a" is subtracted (n17). This process simulates that extinct effect decreases gradually if the extinct material jetting is concentrated to the same area in the actual extinguishing operation.

In the case that the value of the timer T is less than the reference value t, a check regarding flag F is performed (n18). The flag F is allocated at an area MA2 in the RAM 20b (referring to FIG. 10), storing the state that the monitor television displaying the spread direction fire video or the extinct direction fire.video If the flag F is reset and the spread direction video is displayed in the monitor television 8, the valid points P is added to a counter C2 (referring to FIG. 10) which is allocated at an area MA3 (n19). Next, a judgement whether the counter C2 counts more value than the specific value k is performed (n20), and if the counter C2 counts more value than the specific value k the flag F is reset, therefore, the monitor television 8 starts to display the extinct direction fire video. In the step n18, if the flag F has been set and the television 8 displays the extinct direction fire video, the process proceeds to n22.

In the simulation mode, the imitation apparatus 1 plays back the videos so that the monitor television 8 displays continuously the stages of the spread direction fire videos: initial 1 stage, initial 2 stage, middle stage, later stage, and the latest stage, after displaying a ignition video. While the spread direction fire video is played back, the valid points set in the areas corresponding to the direction of the imitation nozzle 10 is added at step n20. Then, when the added value is over the specific value k, the display video is changed to the extinct direction fire video. The playing back of the spread direction fire video is performed as stated above. Namely, first, the distance between the imitation apparatus body 1 and the imitation nozzle 10 is calculated ,then the farther fire video or the nearer fire video is selected.

Figures 11, 12:
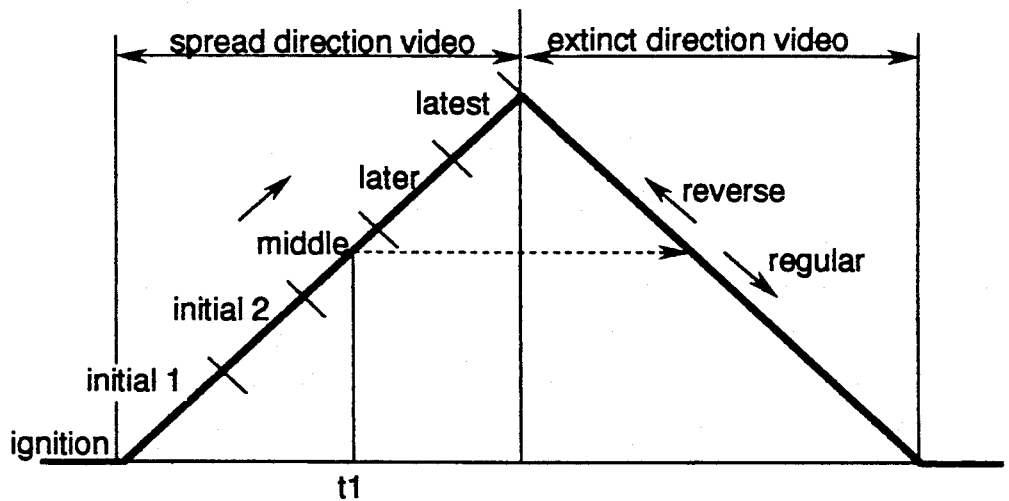
FIG. 11 shows play back process of the fire video in the imitation apparatus for fire extinguishing training.
FIG. 12 shows a relation between a fire extinguishing direction video on the display and the valid points.

If the added value of the valid points is over the specific value k and the process is proceeds to the step to play back the extinct direction fire video, after that the playing back speed and the playing back direction is decided based on the table shown in FIG. 12. For example, if the added value of the valid points is over the specific value k at the timing t1 in FIG. 11, the microcomputer 20 reads the flame number of the playing back fire video at present time and instructs an another flame number, which includes the same fire video as the present fire videoto, to the laser disc player 28. The another flame is in a laser disc area which stores the extinct direction fire videos. Therefore, the spread direction fire videos can be changed smoothly to the extinct direction fire videos without sudden change of the firing view on the monitor television display. After that the extinct direction fire videos are played back with the playing back speed and the playing back direction according to the valid points of the areas pointed by the imitation nozzle 10, at the steps n11 to n18 and n22.

In FIG. 12, for example, if 5 points score of the valid points is detected fire continuously while the middle stage extinct direction fire videos are played back, all of the middle stage extinct direction videos are played back to regular direction in 15 seconds, whereas if 0 point score of the valid point is detected while the middle stage extinct direction fire videos are played back, all of the middle stage extinct direction fire videos are played back to reverse direction in 20 seconds. The score point 00 indicates that the extinct material is exhausted. This means that the extinguishing operation is in failure. For example, if the extinguishing operation comes to failure while the middle stage spread direction fire videos are played back, all of the middle stage direction fire videos are played back to the reverse direction in 17 seconds.

In the above example, the nearer fire video or the farther fire video are played back according to the current place of the imitation nozzle 10 against the imitation apparatus body 1, therefore, the simulation of the actual extinguishing operation becomes realistic. And natural fire video can be displayed on the monitor television display according to the operation of the imitation extinguisher 2, by selection of the kind, the playing back speed and the playing back direction of the video played back based on the valid points set in the areas to which the imitation nozzle 10 points.

It is possible that the playing back speed is changed according to the added value of the valid points while the spread direction video is played back. This enables the imitation apparatus to display the fire video realistically.

According to the above example, this imitation apparatus for fire extinguishing training allows of displaying of various fire videos which is varied according to the direction of the imitation nozzle and the distance between the imitation nozzle and the imitation apparatus body, thereby allowing of realistic simulation. Moreover, the video is more realistic by the appraisal of the extinct effect based on the valid points set in the display area according to the direction of the imitation nozzle.

What is claimed is:

1. An imitation apparatus for fire extinguishing training comprising:
  fire video storing means for storing a fire video previously;
  video playing back means for playing back the fire video stored in the fire video storing means;
  video display means for displaying an output signal of the video playing back means;
  imitation fire extinct means having a imitation nozzle and having a capability of imitation operation for extinct material jetting;
  imitation operation detecting means for detecting the imitation operation of the imitation fire extinct means;
  nozzle direction detecting means for detecting direction of the imitation nozzle when the imitation operation being detected by the imitation operation detecting means;

effect appraisal means for appraising extinct effect based on the direction of the imitation nozzle; and fire video selecting means for selecting a fire video according to the appraisal of the extinct effect by controlling the video playing back means.

2. An imitation apparatus for fire extinguishing training according to claim 1, further comprising extinct distance detecting means for detecting extinct distance between said video display means and said imitation nozzle, wherein said effect appraisal means appraises the extinct effect based on further the extinct distance.

3. An imitation apparatus for fire extinguishing training, according to claim 1, wherein said fire video storing means stores father fire videos and nearer fire videos.

4. An imitation apparatus for fire extinguishing training, according to claim 3, wherein said fire video storing means further stores the farther fire videos and the nearer fire videos every pertinent fire stage regarding firing degree.

5. An imitation apparatus for fire extinguishing training, according to claim 1, wherein said effect appraisal means comprising:

valid points storing means for storing valid points set on every divided display area of said video display means; and valid points reading means for reading the valid points of the areas according to the direction of said imitation nozzle.

6. An imitation apparatus for fire extinguishing training, according to claim 5, wherein said valid points reading means reads the valid points of the areas according to further distance between said video display means and said imitation nozzle.

7. An imitation apparatus for fire extinguishing training, according to claim 1, wherein said nozzle direction detecting means comprises a infrared transmitter for transmitting infrared rays from said imitation nozzle and a infrared sensor which is provided near to said video display means.

8. An imitation apparatus for fire extinguishing training, according to claim 2, wherein said extinct distance detecting means comprises a ultrasonic transmitter for transmitting a ultrasound from said imitation nozzle and a ultrasonic receiver for receiving the ultrasound which is provided near to said video display means.

* * * * *